US012700709B2

(12) United States Patent (10) Patent No.: US 12,700,709 B2
Song et al. (45) Date of Patent: Aug. 4, 2026

(54) MODE-LOCKED RESONATOR AND ULTRASHORT PULSE LASER COMPRISING THE SAME

(71) Applicant: KOREA INSTITUTE OF SCIENCE AND TECHNOLOGY, Seoul (KR)

(72) Inventors: Yong-Won Song, Seoul (KR); Hyowon Moon, Seoul (KR); Oleksiy Kovalchuk, Seoul (KR); Sungjae Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 623 days.

(21) Appl. No.: 18/137,027

(22) Filed: Apr. 20, 2023

(65) Prior Publication Data

US 2024/0258762 A1 Aug. 1, 2024

(30) Foreign Application Priority Data

Feb. 1, 2023 (KR) ........................ 10-2023-0013641

(51) Int. Cl.
H01S 3/1118 (2023.01)
H01S 3/067 (2006.01)
(Continued)

(52) U.S. Cl.
CPC ........ H01S 3/1118 (2013.01); H01S 3/06745 (2013.01); H01S 3/06791 (2013.01); H01S 3/094003 (2013.01)

(58) Field of Classification Search
CPC .............. H01S 3/1118; H01S 3/06745; H01S 3/06791; H01S 3/094003; H01S 3/06712;
(Continued)

(56) References Cited

U.S. PATENT DOCUMENTS

2002/0018617 A1* 2/2002 Iltchenko ........... G02B 6/29341
385/39
2002/0021765 A1* 2/2002 Maleki ...................... G02F 1/17
398/186
(Continued)

FOREIGN PATENT DOCUMENTS

CN 112217089 A 1/2021
CN 112811432 A * 5/2021 ............. C03C 13/04
(Continued)

OTHER PUBLICATIONS

Translation of CN112811432.*
(Continued)

*Primary Examiner* — Xinning(Tom) Niu
(74) *Attorney, Agent, or Firm* — NSIP Law

(57) ABSTRACT

Disclosed are a mode-locked resonator according to an embodiment and an ultrashort pulse laser comprising the mode-locked resonator. The mode-locked resonator according to an embodiment includes a resonator including a shape of a sphere; and a saturable absorber coated on a surface of the resonator, wherein the resonator is coupled with some photons traveling in a tapered optical fiber disposed near the mode-locked resonator and interacts with the saturable absorber based on a Whispering Gallery Mode (WGM).

12 Claims, 21 Drawing Sheets

(51) Int. Cl.
    *H01S 3/094*         (2006.01)
    *H01S 5/10*          (2021.01)

(58) Field of Classification Search
    CPC .. H01S 3/1112; H01S 3/1115; H01S 3/06708;
                                       H01S 5/1075
    See application file for complete search history.

(56)              References Cited

U.S. PATENT DOCUMENTS

| | | | | |
|---|---|---|---|---|
| 2006/0114960 | A1* | 6/2006 | Snee | H01S 5/10 |
| | | | | 372/67 |
| 2022/0140564 | A1* | 5/2022 | Song | H01S 3/06704 |
| | | | | 372/18 |
| 2022/0181838 | A1 | 6/2022 | Song et al. | |
| 2023/0009057 | A1 | 1/2023 | Song et al. | |

FOREIGN PATENT DOCUMENTS

| | | |
|---|---|---|
| CN | 115084994 A | 9/2022 |
| KR | 10-1589577 B1 | 1/2016 |
| KR | 10-2020-0013759 A | 2/2020 |
| KR | 10-2308705 B1 | 10/2021 |
| KR | 10-2022-0079412 A | 6/2022 |
| KR | 10-2022-0118431 A | 8/2022 |
| KR | 10-2023-0008449 A | 1/2023 |
| WO | WO 2018/231574 A1 | 12/2018 |
| WO | WO 2021/119182 A1 | 6/2021 |

OTHER PUBLICATIONS

Lee, Sungjae, et al. "Graphene self-phase-lockers formed around a Cu wire hub for ring resonators incorporated into 57.8 gigahertz fiber pulsed lasers." *ACS nano* vol. 14. Issue 11 (2020). pp 15944-15952.

Peccianti, Marco, et al. "Demonstration of a stable ultrafast laser based on a nonlinear microcavity." *Nature communications* vol. 3. Issue 1 (2012): 765. pp. 1-6.

Liu, Meng, et al. "Graphene-decorated microfiber knot as a broadband resonator for ultrahigh-repetition-rate pulse fiber lasers." *Photonics Research* vol. 6. Issue 10 (2018). pp. C1-C7.

Korean Office Action issued on Apr. 15, 2025, in corresponding Korean Patent Application No. 10-2023-0013641. (8pages in English, 6pages in Korean).

Uddin, Siam, and Yong-Won Song. "Atomic carbon spraying: direct growth of graphene on customized 3D surfaces of ultrafast optical devices." Advanced Optical Materials 8.12, 2020. (pp. 1902091: 1-11).

\* cited by examiner

MODE-LOCKED RESONATOR AND ULTRASHORT PULSE LASER COMPRISING THE SAME

DESCRIPTION OF GOVERNMENT-FUNDED RESEARCH AND DEVELOPMENT

This research is conducted under the support of Korea Institute of Science and Technology research funding, Ministry of Science and ICT [Project Name: Quantum computing (photon-atom based) technology development project, Project Serial Number: 1711173298, Project ID Number: 2E31530].

This research is conducted under the support of personal basic research (Ministry of Science and ICT), Ministry of Science and ICT [Project Name: Research of nanomaterial-dispersed nonlinear optical information device based on ultraprecision 3D printing, Project Serial Number: 1711153825, Project ID Number: 2022R1 A2B5B02002001].

CROSS-REFERENCE TO RELATED APPLICATION

This application claims priority to Korean Patent Application No. 10-2023-0013641, filed on Feb. 1, 2023, and all the benefits accruing therefrom under 35 U.S.C. § 119, the contents of which in its entirety are herein incorporated by reference.

BACKGROUND

1. Field

Exemplary embodiments relate to a mode-locked resonator and an ultrashort pulse laser comprising the mode-locked resonator.

2. Description of the Related Art

An optical fiber has low loss, immunity to external magnetic fields, wide bandwidth, low cost and small and flexible structural advantages. Due to these features, optical fiber based lasers, especially, pulsed lasers have a wide range of applications including industrial processing, information communication, LIDAR and medical surgical equipment.

Among them, an ultrashort pulse laser plays a leading role in the growth of microelectronics fabrication technology. In this instance, passive mode locking is used as one of techniques for generating the ultrashort pulse laser. The passive mode-locked laser may be created using non-linear nanomaterials.

For example, the passive mode-locked ultrashort pulse laser may be created by a graphene saturable absorber applied to an optical fiber system. Additionally, the ultrashort pulse laser having high repetition rate of GHz level may be generated by applying a ring resonator formed by an optical fiber wound on the graphene saturable absorber or an integrated resonator formed by graphene transfer to the passive mode locking technique and filtering the wavelength component of the laser.

However, since the passive mode-locked pulse laser with the optical fiber ring resonator or the integrated resonator fabricated by the semiconductor process uses an evanescent field region of the laser traveling for interactions with the non-linear nanomaterials, it is necessary to uniformly coat the nanomaterials on the resonator surface to minimize losses such as unnecessary light absorption and scattering and maximize interactions.

In general, the graphene based saturable absorber is fabricated by transfer onto the surface of the optical device, so there are challenges such as impurity infiltration in the transfer process, damage to the graphene film and non-uniform coating on the surface. Additionally, the optical fiber device or the semiconductor process-dependent integrated resonator device necessary for the saturable absorber requires a complicated procedure, and in particular, the optical fiber based resonator has very low fabrication efficiency due to frequent damage to the optical fiber in the fabrication process.

In the end, the fabrication and insertion of the resonator to increase the repetition rate in the passive mode-locked pulse laser using the saturable absorber requires an easy fabrication process and a uniform coating of optical non-linear nanomaterials to maximize nonlinear interactions.

RELATED LITERATURE

Patent Literature

Korean Patent Publication No. 10-2022-0079412 (published Jun. 13, 2022)

SUMMARY

Exemplary embodiments are directed to providing an ultrashort pulse laser.

A mode-locked resonator according to an embodiment includes a resonator including a shape of a sphere; and a saturable absorber coated on a surface of the resonator, wherein the resonator is coupled with some photons traveling in a tapered optical fiber disposed near the resonator and interacts with the saturable absorber based on a Whispering Gallery Mode (WGM).

The shape of the sphere may include a shape of a microsphere produced by an electric arc.

A diameter of the microsphere may be determined based on a diameter of a raw optical fiber to which an electric arc is applied.

A diameter of the microsphere may be determined based on a process condition of electrical arc.

A diameter of the microsphere may be determined based on an amount of the electric arc which is applied to raw optical fiber.

A diameter of the microsphere may be determined based on a power of the electric arc which applied to raw optical fiber.

The resonator may be disposed near the tapered optical fiber without contact with the tapered optical fiber.

The saturable absorber may be formed by synthesizing and coating non-linear nanomaterials including graphene.

The saturable absorber may be formed by growing and coating the non-linear nanomaterials on the surface of the resonator based on Atomic Carbon Spray (ACS).

The mode-locked resonator may filter some of wavelengths in a spectrum of light traveling in the tapered optical fiber based on the whispering gallery mode.

The mode-locked resonator may output an ultrashort pulse laser by outputting light of a first intensity by constructive interference of phase matched modes in some photons coupled with the resonator and outputting light of a second intensity by destructive interference of phase mismatched modes.

The mode-locked resonator may determine a pulse repetition rate of an ultrashort pulse laser output from the mode-locked resonator based on a diameter of the sphere.

The tapered optical fiber may further inject pump light to compensate for a photothermal effect of the saturable absorber.

An ultrashort pulse laser according to an embodiment includes the mode-locked resonator; a light source to supply light; an optical multiplexer (a wavelength division multiplexer) to perform wavelength division multiplexing of the light; an amplifier to amplify the light; a polarization controller to control a polarization state of the light; an optical isolator to adjust a direction of the light; and an optical fiber connecting the tapered optical fiber, the light source, the optical multiplexer, the amplifier, the polarization controller and the optical isolator.

The shape of the sphere may include a shape of a microsphere produced by an electric arc.

A diameter of the microsphere may be determined based on a diameter of a raw optical fiber to which the electric arc is applied.

A diameter of the microsphere may be determined based on a process condition of electrical arc.

A diameter of the microsphere may be determined based on an amount of the electric arc which is applied to raw optical fiber.

A diameter of the microsphere may be determined based on a power of the electric arc which applied to raw optical fiber.

The resonator may be disposed near the tapered optical fiber without contact with the tapered optical fiber.

The saturable absorber may be formed by synthesizing and coating non-linear nanomaterials including graphene.

The saturable absorber may be formed by growing and coating the non-linear nanomaterials on the surface of the resonator based on ACS.

The mode-locked resonator may filter some of wavelengths in a spectrum of light traveling in the tapered optical fiber based on the whispering gallery mode.

The mode-locked resonator may output the ultrashort pulse laser by outputting light of a first intensity by constructive interference of phase matched modes in some photons coupled with the resonator and outputting light of a second intensity by destructive interference of phase mismatched modes.

The mode-locked resonator may determine a pulse repetition rate of the ultrashort pulse laser output from the mode-locked resonator based on a diameter of the sphere.

The tapered optical fiber may further inject pump light to compensate for a photothermal effect of the saturable absorber.

The exemplary embodiments may provide a high repetition rate pulse laser by virtue of the saturable absorber based on a whispering gallery mode.

The exemplary embodiments may simplify the procedure by fabricating a microsphere resonator using an electric arc.

The exemplary embodiments may improve the quality of the ultrashort pulse laser due to the absence of direct contact with the optical fiber.

The exemplary embodiments may provide a uniform coating of the saturable absorber by synthesizing non-linear nanomaterials on the surface of the resonator.

The exemplary embodiments may adjust the pulse repetition rate by the photothermal effect by injecting pump light.

DETAILED DESCRIPTION

Hereinafter, a detailed description of an embodiment will be provided with reference to the accompanying drawings. The detailed description is provided to help as comprehensive understanding of a sensor described herein. However, this is provided by way of illustration and the present disclosure is not limited thereto.

In describing an embodiment, when it is determined that a certain description of known relevant technology may unnecessarily obscure the subject matter of the embodiment, the detailed description is omitted. Additionally, the numbers (for example, first, second and so on) used in the description of an embodiment are identification signs to distinguish one element from the other.

The terms as used herein are defined in consideration of functions in the present disclosure, and may differ depending on the intention of users or operators or the convention. Accordingly, the definition should be made based on the context throughout the specification. The terms used herein are used to describe an embodiment and should not be regarded as limiting. Unless the context clearly indicates otherwise, the singular form includes the meaning of the plural form. The term "comprising" or "including" when used in this specification, specifies the presence of stated components, integers, steps, operations, elements, some of them or a combination thereof, but does not preclude the presence or addition of one or more other components, integers, steps, operations, elements, some of them or a combination thereof.

Figure 1:
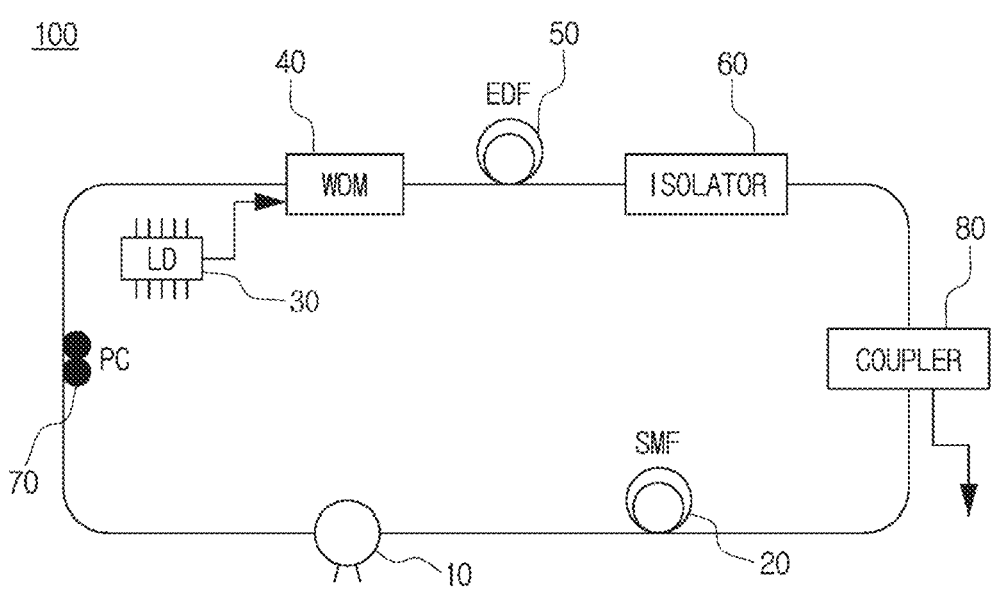
FIG. 1 is a diagram showing an ultrashort pulse laser according to an embodiment.

FIG. 1 is a diagram showing an ultrashort pulse laser 100 according to an embodiment.

Referring to FIG. 1, the ultrashort pulse laser 100 according to an embodiment may include at least one of a mode-locked resonator 10, an optical fiber 20, a light source 30, an optical multiplexer 40, an amplifier 50, an optical isolator 60, a polarization controller (PC) 70 or an optical coupler 80.

Here, the ultrashort pulse laser 100 may include a passive mode-locked pulse laser. Specifically, the ultrashort pulse laser 100 may include the passive mode-locked laser to produce an ultrashort pulse laser with high repetition rate of GHz level.

The mode-locked resonator 10 is a resonator for the ultrashort pulse laser. The mode-locked resonator 10 is a resonator with a saturable absorber coated on the surface of the resonator including a shape of a sphere.

Specifically, the mode-locked resonator 10 may be coupled with some photons traveling in the optical fiber 20 disposed near the mode-locked resonator 10. Here, some photons interact with the saturable absorber of the mode-locked resonator 10 based on a Whispering Gallery Mode (WGM).

The optical fiber 20 may be a single mode fiber. The optical fiber 20 may be disposed near the mode-locked resonator 10. Here, part of the light traveling in the optical fiber 20 may be coupled with the mode-locked resonator 10.

Part of the coupled light may interact with the saturable absorber 12 based on the Whispering Gallery Mode (WGM) at the mode-locked resonator 10, to be specific, the resonator 11. Here, the optical fiber 20 may include a tapered optical fiber 21 disposed without direct/indirect contact with the mode-locked resonator 10.

The optical fiber 20 connects at least one of the light source 30, the optical multiplexer 40, the amplifier 50, the optical isolator 60, the polarization controller 70 or the optical coupler 80. In this instance, the optical fiber 20 may be disposed near the mode-locked resonator 10 without direct/indirect contact with the mode-locked resonator 10.

The optical fiber 20 may include the tapered optical fiber 21 disposed near the mode-locked resonator 10. The tapered optical fiber 21 may have the thickness decreasing with respect to the location of the mode-locked resonator 10. Likewise, the tapered optical fiber 21 may be not in direct/indirect contact with the mode-locked resonator 10.

The light source 30 supplies light to the ultrashort pulse laser 100. Specifically, the light source 30 may be connected to one end of the optical multiplexer 40 to supply light to the input of the optical multiplexer 40. The light source 30 may be a device that outputs light in a specific band of wavelengths. For example, the light source 30 may be a Laser Diode (LD).

Although the light source 30 is illustrated and described as the laser diode, this is provided by way of illustration, and the light source 30 may include any device that outputs a continuous wave and is not necessarily limited to the laser diode.

The optical multiplexer 40 performs wavelength division multiplexing of the light. The optical multiplexer 40 may combine the light of the light source 30 with light of different wavelengths and simultaneously output multibeam lasers. For example, the optical multiplexer 40 may include a Wavelength Division Multiplexer (WDM).

One end of the optical multiplexer 40 may be connected to the light source 30 to receive the light from the light source 30 and output different wavelengths of light from the other end using the plurality of lasers. The optical multiplexer 40 may transmit a plurality of different carrier wave signals to the single optical fiber 20.

The amplifier 50 amplifies the light. Specifically, one end of the amplifier 50 may be connected to the optical multiplexer 40 to amplify the output light from the optical multiplexer 40. One end of the amplifier 50 may be indirectly connected to the light source 30 to amplify the light traveling in a cavity.

The amplifier 50 may include, for example, an Erbium Doped Fiber Amplifier (EDFA).

Although the amplifier 50 is illustrated and described as the Erbium doped fiber amplifier, this is provided by way of illustration and the amplifier 50 may include any device that increases the light intensity, and is not necessarily limited to the Erbium doped fiber amplifier.

The optical isolator 60 adjusts the direction of the light. The optical isolator 60 may align the direction to allow the light applied to the optical isolator 60 to travel in one direction. Specifically, one end of the optical isolator 60 may be connected to the amplifier 50 to keep the travel direction of the output light from the amplifier 50 constant. Accordingly, the optical isolator 60 may prevent an error occurring from the reflection of the light.

The polarization controller 70 controls the polarization state of the light. The polarization controller 70 may control the polarization angle of the applied light. The polarization controller 70 may polarize the applied light in a linear direction. One end of the polarization controller 70 may be connected to the optical coupler 80 to control the polarization angle of the output light from the optical coupler 80.

The optical coupler 80 may split the applied light into a plurality of outputs. For example, the 90/10 optical coupler 80 may split the applied light into two outputs, one with 90% in a first light path and the other with 10% in a second light path. Here, the optical coupler 80 may output 10% of the light out of the optical fiber 20 for the output of the pulse laser.

Figure 2:
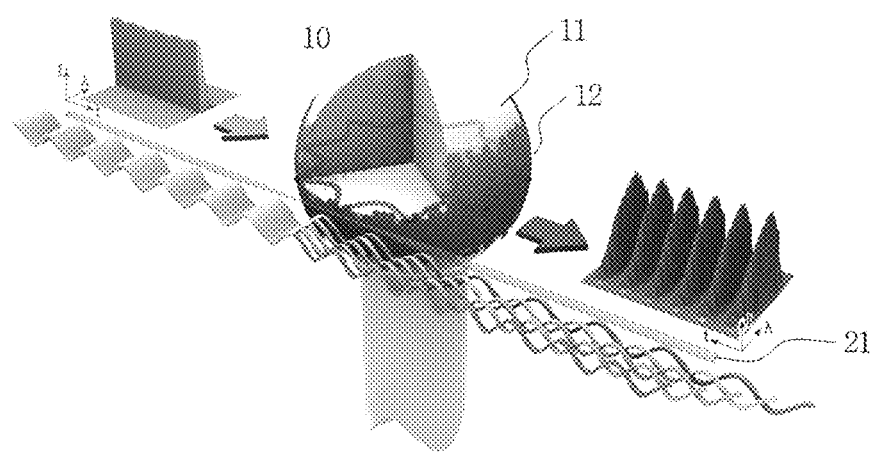
FIG. 2 is a diagram showing a mode-locked resonator according to an embodiment.

FIG. 2 is a diagram showing the mode-locked resonator 10 according to an embodiment.

Referring to FIG. 2, the mode-locked resonator 10 includes the resonator 11 and the saturable absorber 12.

The resonator 11 may include an optical resonator that is not coated with the saturable absorber 12 on the surface. The resonator 11 may include a shape of a sphere. The resonator 11 may be coupled with some photons traveling in the tapered optical fiber 21 disposed near the resonator 11 using the spherical shape and may interact with the saturable absorber 12 based on the Whispering Gallery Mode (WGM).

The whispering gallery mode refers to a phenomenon in which signals applied to a curved surface reflect and converge on one point. Here, the whispering gallery mode may be extended to a phenomenon in which signals converge toward a specific point when a transverse wave such as light is incident on a spherical surface.

The resonator 11 may be coupled with an evanescent field induced by the tapered optical fiber 21 disposed near the mode-locked resonator 10. The resonator 11 may be coupled with some of photons traveling in the tapered optical fiber 21. The coupled photons may travel along the surface of the resonator 11 based on the whispering gallery mode.

The resonator 11 may allow the coupled photons to travel along the surface of the resonator 11 faster based on the whispering gallery mode. In this instance, the photons traveling along the surface of the resonator 11 faster may interact with the saturable absorber 12 to form the pulse laser.

The mode-locked resonator 10 may filter some of the wavelengths in the spectrum of the light by the whispering gallery mode. Specifically, the mode-locked resonator 10 may filter some of the wavelengths in the spectrum of the light traveling in the tapered optical fiber 21 by the whispering gallery mode.

In other words, the mode-locked resonator 10 may change the spectrum of the light traveling in the tapered optical fiber 21 through filtering.

The saturable absorber 12 may be coated on the surface of the resonator 11. Specifically, the saturable absorber 12 may be formed by coating non-linear nanomaterials including graphene on the surface of the resonator 11.

The saturable absorber 12 may absorb some of photons coupled with the resonator 11. The saturable absorber 12 may absorb some of the coupled photons based on phase matching or mismatching between the photons coupled with the resonator 11.

Specifically, the saturable absorber 12 may absorb the phase mismatched modes in the coupled photons. In contrast, the saturable absorber 12 may not absorb the phase matched modes in the coupled photons.

The saturable absorber 12 may absorb the modes in which the intensity decreases by destructive interference due to the phase mismatching in the coupled photons, and may not absorb the modes in which the intensity increases by constructive interference due to the phase matching to allow them pass.

Figure 3A:
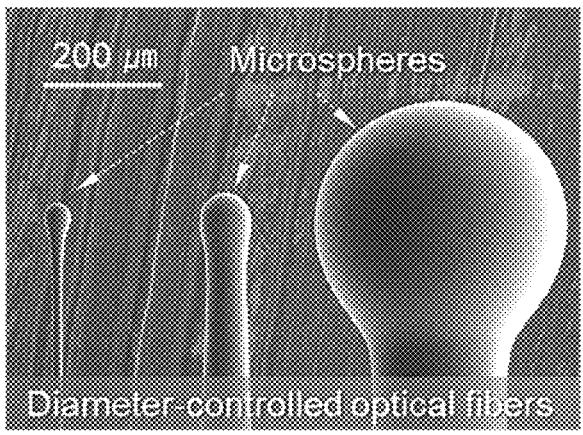
FIG. 3A is a Scanning Electron Microscope (SEM) image showing the shape of an exemplary resonator.

FIG. 3A is a Scanning Electron Microscope (SEM) image showing the shape of the exemplary resonator 11.

Referring to FIG. 3A, the resonator 11 may include a shape of a sphere with different diameters. The resonator 11 may include a shape of a microsphere produced by an electric arc.

Specifically, the diameter of the microsphere may be determined based on the diameter of the raw optical fiber 20 to which the electric arc is applied. For example, the diameter of the microsphere may be proportional to the diameter of the raw optical fiber 20 to which the electric arc is applied. The diameter of the microsphere may be 50 um to 2,000 um.

Alternatively, the diameter of the microsphere may be determined based on the process condition of electrical arc. Specifically, the diameter of the microsphere may be determined based on the amount of the electric arc which is applied to raw optical fiber. The diameter of the microsphere may be determined based on the power of the electric arc which applied to raw optical fiber.

Alternatively, the shape of the microsphere may be determined based on the process condition of electrical arc. Specifically, the shape of the microsphere may be determined based on the amount of the electric arc which is applied to raw optical fiber. The shape of the microsphere may be determined based on the number of times the electric arc is applied to raw optical fiber. The shape of the microsphere may be determined based on the power of the electric arc which applied to raw optical fiber.

Figure 3B:
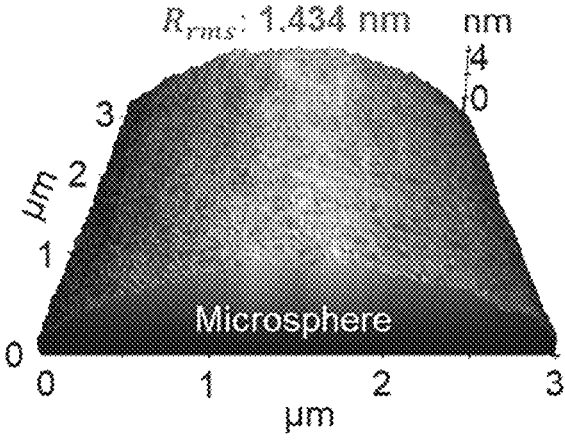
FIG. 3B is an Atomic Force Microscope (AFM) image showing the surface of an exemplary resonator.

FIG. 3B is an Atomic Force Microscope (AFM) image showing the surface of the exemplary resonator 11.

Referring to FIG. 3B, the resonator 11 includes a microsphere of a uniform surface.

It is evaluated that the circumference of the microsphere has a qualitatively uniform thickness on the basis of a straight line length of 3 um connecting two points on the circumference of the microsphere.

Figure 3C:
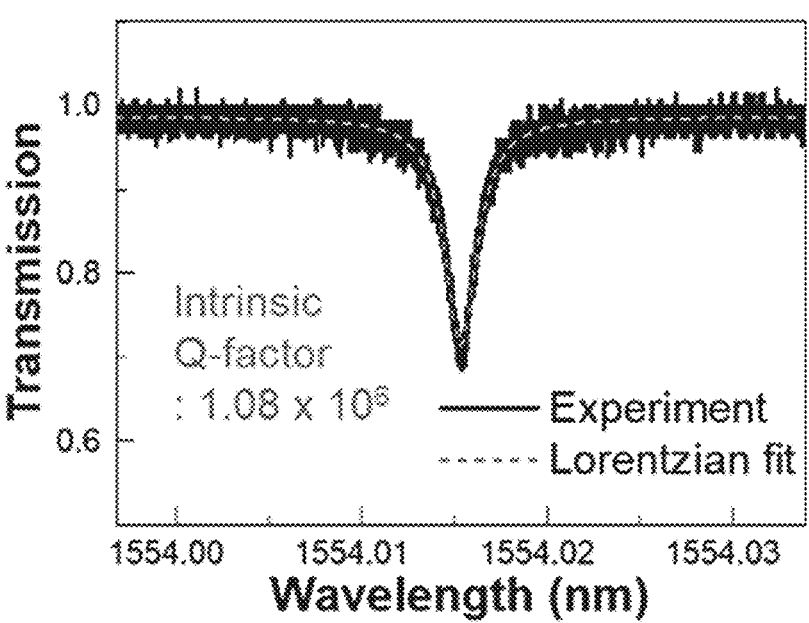
FIG. 3C shows measurement results quantitatively showing the characteristics of an exemplary resonator.

FIG. 3C shows measurement results quantitatively showing the characteristics of the exemplary resonator 11.

Referring to FIG. 3C, the transmission as a function of wavelength of the resonator 11 is shown. It is evaluated that a Lorentzian best fits the transmission as a function of wavelength of the resonator 11. Specifically, when quantitatively measured, the Q-factor of the transmission as a function of wavelength of the resonator 11 is $1.08 \times 10^6$, showing good performance.

Figure 3D:
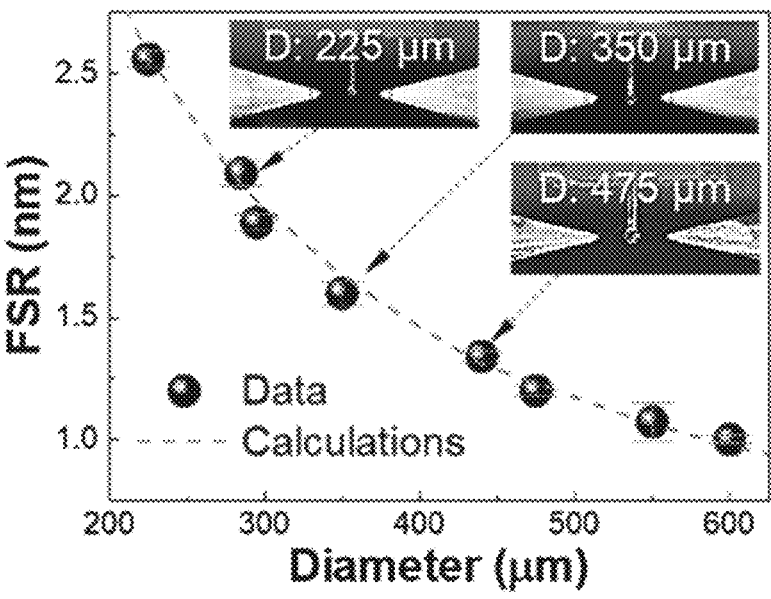
FIG. 3D shows analysis results showing the free spectral range (FSR) as a function of diameter of an exemplary mode-locked resonator.

FIG. 3D shows analysis results showing the free spectral range (FSR) as a function of diameter of the exemplary mode-locked resonator 10.

Referring to FIG. 3D, the FSR as a function of the diameter of the mode-locked resonator 10 is shown. The diameter of the mode-locked resonator 10 may be inversely proportional to the FSR. In other words, the mode-locked resonator 10 may have a change in the repetition rate of the pulse laser with a change in the diameter of the resonator 11.

Figure 4A:
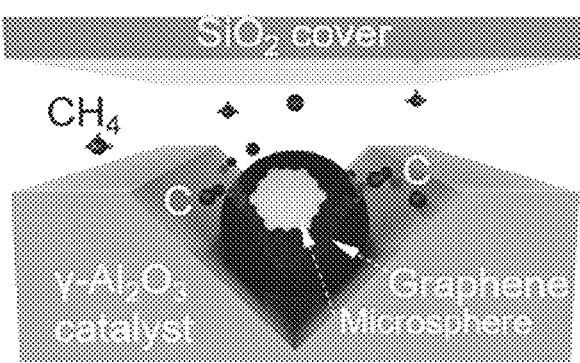
FIG. 4A is a diagram showing a coating method of an exemplary saturable absorber.

FIG. 4A is a diagram showing a coating method of the exemplary saturable absorber 12.

Referring to FIG. 4A, the saturable absorber 12 may be formed by directly synthesizing and coating non-linear nanomaterials on the surface of the resonator 11. For example, the saturable absorber 12 may include the non-linear nanomaterials including graphene.

The saturable absorber 12 may be formed by directly synthesizing graphene on the surface of the resonator 11 by the chemical vapour deposition method using carbon atoms. Specifically, the saturable absorber 12 may be formed by growing and coating the non-linear nanomaterials on the surface of the resonator 11 based on Atomic Carbon Spray (ACS).

Here, the ACS may refer to a method used to form the saturable absorber 12 by directly synthesizing graphene on the surface of the resonator 11 using non-metal catalysts (for example, $\gamma$-$Al_2O_3$) and carbon atoms.

The saturable absorber 12 may be directly synthesized on the surface of the resonator 11 accommodated on the non-metal catalysts through the chemical vapour deposition method using carbon atoms.

In this instance, the non-metal catalyst may include a groove to accommodate the resonator 11, and the width of the groove may decrease with the increasing depth. That is, the non-metal catalyst may trap the resonator 11 in the groove to prevent the movement of the resonator 11.

Figure 4B:
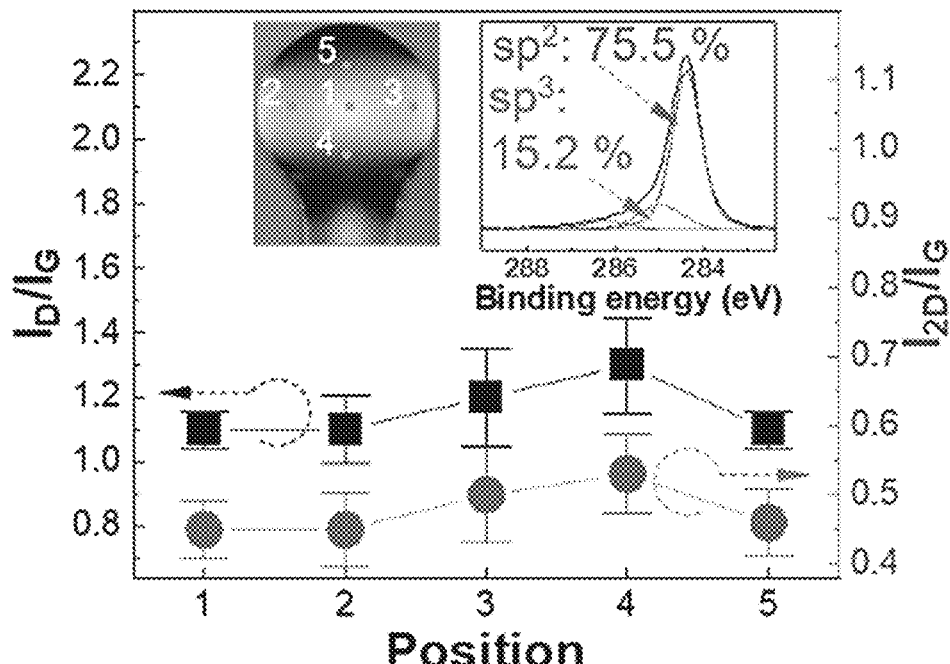
FIG. 4B shows measurement results showing uniform Raman spectrum characteristics and $sp^2$ bonding ratio of a saturable absorber directly grown on the surface of an exemplary mode-locked resonator.

FIG. 4B shows the measurement results showing uniform Raman spectrum characteristics and $sp^2$ bonding ratio of the saturable absorber directly grown on the surface of the exemplary mode-locked resonator 10.

Referring to FIG. 4B, a correlation of $I_D/I_G$ and $I_{2D}/I_G$ of Raman spectra as a function of position of the mode-locked resonator 10 is shown.

In this instance, $I_D$, $I_{2D}$ and $I_G$ refer to the peak intensity of D band, 2D band and G band that are Raman characteristics of graphene, respectively. The ratio of $I_D/I_G$ is closely related to the ratio of $SP^2$ hybridized carbon. As $I_D/I_G$ and $I_{2D}/I_G$ increases, the ratio of $SP^2$ hybridized carbon decreases.

Referring to FIG. 4B again, $I_D/I_G$ and $I_{2D}/I_G$ show values within a predetermined range of 0.8 or more and 1.6 or less regardless of the position of the mode-locked resonator 10. From this, it can be seen that the surface of the mode-locked resonator 10 is uniform.

Referring to FIG. 4B again, $I_D/I_G$ and $I_{2D}/I_G$ show relatively low values of 1.6 or less, and it is measured that the ratio of $SP^2$ hybridized carbon of graphene is high. From this, it is found that the quality of graphene synthesized on the mode-locked resonator 10 is high.

Figure 4C:
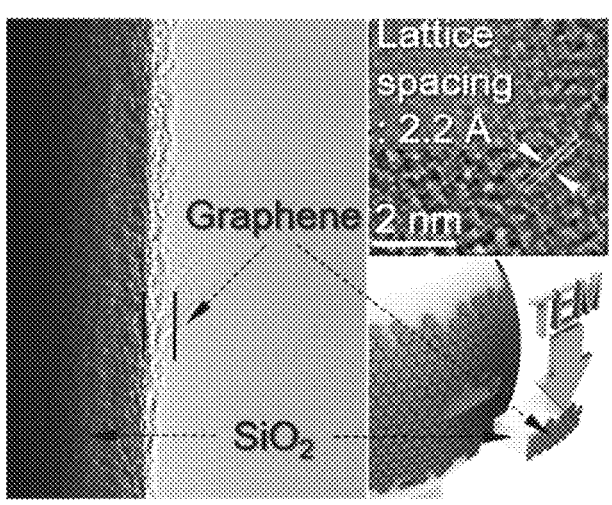
FIG. 4C is a Transmission Electron Microscope (TEM) image showing the characteristics of an exemplary saturable absorber.

FIG. 4C is a Transmission Electron Microscope (TEM) image showing the characteristics of the exemplary saturable absorber 12.

Referring to FIG. 4C, the resonator 11 and the saturable absorber 12 in cross section are shown. In this instance, the saturable absorber 12 may include graphene. The graphene is a crystal made up of molecules of the same type and structure, and the atomic spacing may be 2.2 Å.

In this instance, the resonator 11 may be produced by applying the electric arc to the optical fiber 20, and the optical fiber 20 may be made of the commonly used material, silicon ($SiO_2$).

Figure 4D:
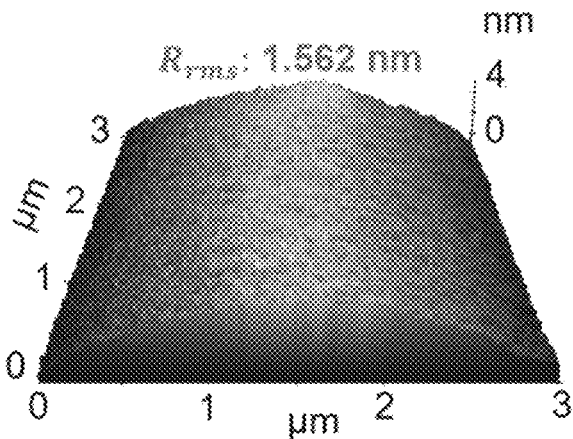
FIG. 4D is an AFM image showing the surface of a mode-locked resonator coated with an exemplary saturable absorber.

FIG. 4D is an AFM image showing the surface of the mode-locked resonator 10 coated with the exemplary saturable absorber 12.

Referring to FIG. 4D, the saturable absorber 12 may be formed with a uniform thickness.

It is evaluated that the periphery of the saturable absorber 12 has a qualitatively uniform thickness on the basis of a straight line length of 3 um connecting two points on the periphery of the saturable absorber 12.

Figure 4E:
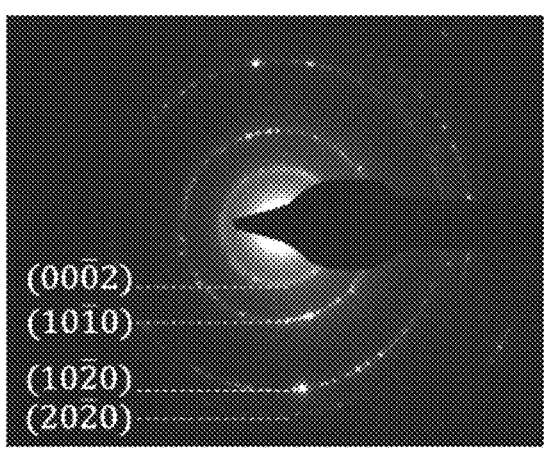
FIG. 4E shows measurement results showing the crystal structure of an exemplary saturable absorber.

FIG. 4E shows measurement results showing the crystal structure of the exemplary saturable absorber 12.

Referring to FIG. 4E, the TEM image of the saturable absorber 12 includes Selected Area Electron Diffraction (SAED) patterns. In this instance, the saturable absorber 12 may be an absorber formed by directly synthesizing graphene on the surface of the resonator 11. When seeing the illustrated SAED patterns, it is analyzed that the saturable absorber 12 has a polycrystalline structure.

Figure 4F:
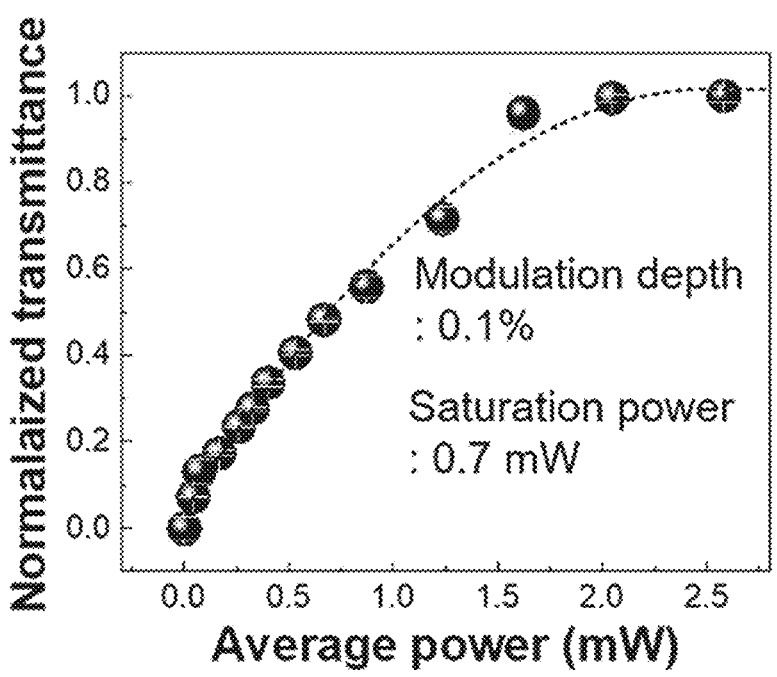
FIG. 4F shows analysis results showing the saturable absorption characteristics of an exemplary saturable absorber.

FIG. 4F shows analysis results showing the saturable absorption characteristics of the exemplary saturable absorber 12.

Referring to FIG. 4F, the transmittance as a function of light intensity is shown. In other words, a ratio of transmission to absorption of the saturable absorber 12 as a function of light intensity is shown.

In this instance, the saturable absorber 12 includes graphene directly synthesized on the surface of the resonator 11 by ACS, and absorbs low intensity light (low transmittance) and does not absorb high intensity light and allows it to pass (high transmittance). In this instance, the saturation light intensity of graphene is 0.7 mW, and it is analyzed that the light absorption of the saturable absorber 12 decreases from the light intensity of 0.7 mW or more.

That is, it is evaluated that the saturable absorber 12 directly synthesized on the surface of the resonator 11 by ACS preserves the intrinsic properties including the saturation characteristics of graphene.

Figure 5A:
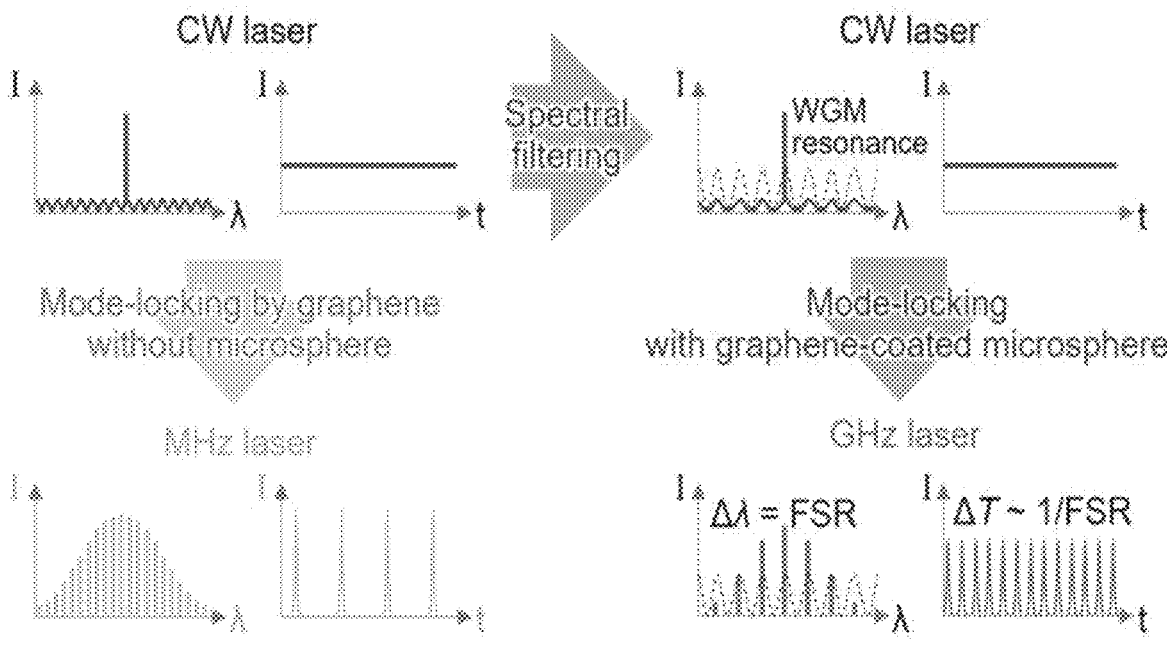
FIG. 5A is a conceptual diagram showing the working principle of an ultrashort pulse laser according to an embodiment.

FIG. 5A is a conceptual diagram showing the working principle of the ultrashort pulse laser 100 according to an embodiment.

Referring to FIG. 5A, the characteristics of the common ultrashort pulse laser and the characteristics of the ultrashort pulse laser 100 according to an embodiment are shown.

On the left side of FIG. 5A, the characteristics of the common ultrashort pulse laser are shown. In this instance, the common ultrashort pulse laser may be a graphene based passive mode-locked laser.

On the left top, the wavelength component and time component of a continuous wave applied to the common passive mode-locked laser are shown. In this instance, when seeing the wavelength component on the left bottom, it is found that the passive mode-locked laser generates a pulse laser based on the saturable absorption characteristics of graphene.

On the right side of FIG. 5A, the characteristics of the ultrashort pulse laser 100 according to an embodiment are shown. In this instance, the ultrashort pulse laser 100 according to an embodiment is based on the use of the mode-locked resonator 10 including the microsphere based resonator 11 coated with the saturable absorber 12.

In this instance, seeing the wavelength component of the ultrashort pulse laser 100 according to an embodiment on the right top, it is found that a continuous wave is filtered based on the whispering gallery mode.

When seeing the right bottom, it can be seen that a pulse laser is generated by maintaining the saturable absorption characteristics of graphene, and the repetition rate is improved by the whispering gallery mode, compared to the common passive mode-locked laser.

Figure 5B:
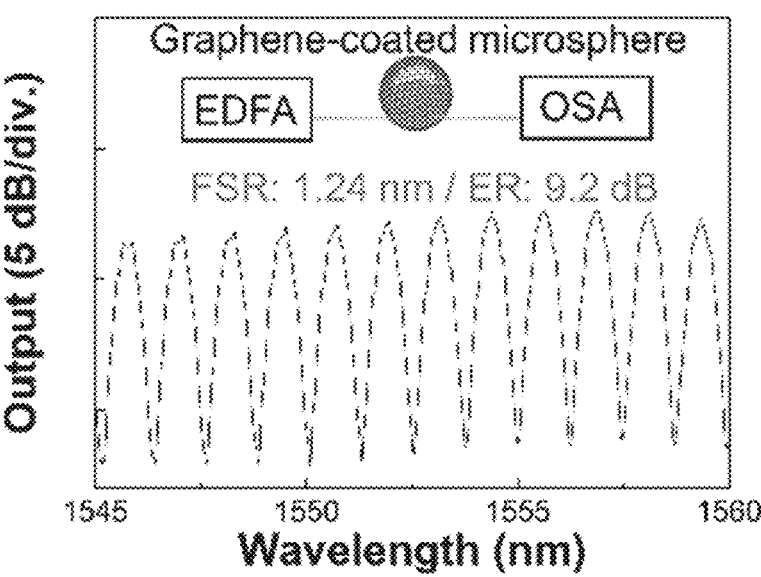
FIG. 5B shows analysis results showing the transmission characteristics of an exemplary mode-locked resonator.

FIG. 5B shows analysis results showing the transmission characteristics of the exemplary mode-locked resonator 10.

Referring to FIG. 5B, the intensity of output light as a function of wavelength of the mode-locked resonator 10 is shown. In this instance, the mode-locked resonator 10 includes the resonator 11 based on the microsphere having the diameter of 475 um, and includes the saturable absorber 12 synthesized by ACS.

Referring to FIG. 5B, it is measured that the mode-locked resonator 10 has the light transmission characteristics of FSR: 1.24 nm, ER: 9.2 dB.

Figure 5C:
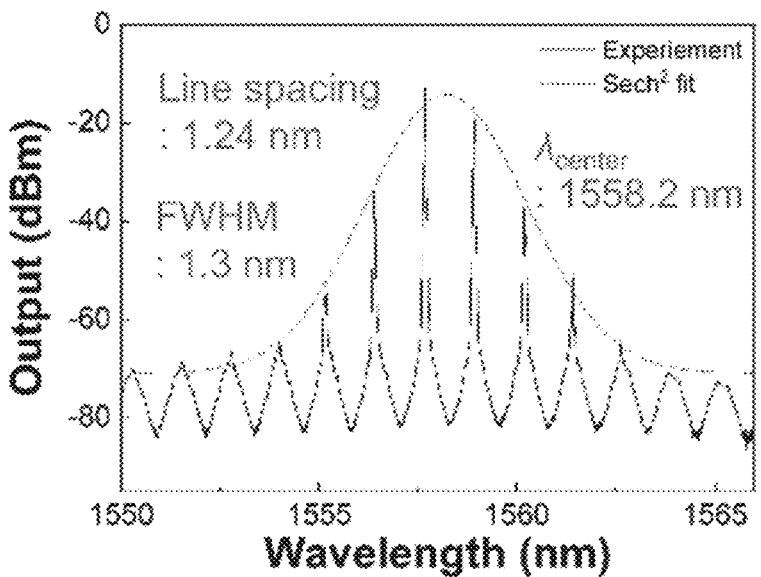
FIG. 5C shows analysis results showing the optical spectrum of an ultrashort pulse laser generated using an exemplary mode-locked resonator.

FIG. 5C shows analysis results showing the optical spectrum of the ultrashort pulse laser generated using the exemplary mode-locked resonator 10.

Referring to FIG. 5C, the intensity of output light as a function of wavelength of the ultrashort pulse laser 100 is shown. In this instance, the mode-locked resonator 10 includes the resonator 11 based on the microsphere having the diameter of 475 um, and includes the saturable absorber 12 synthesized by ACS.

Referring to FIG. 5C, it is measured that the mode-locked resonator 10 generates the pulse laser output at a high repetition rate of Ghz level.

Figure 5D:
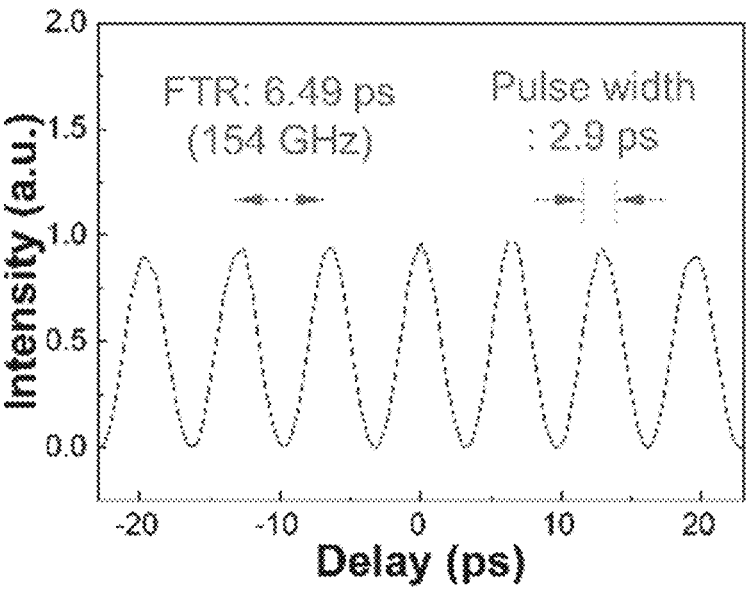
FIG. 5D shows analysis results showing the pulse train of an ultrashort pulse laser generated using an exemplary mode-locked resonator.

FIG. 5D shows analysis results showing the pulse train of the ultrashort pulse laser generated using the exemplary mode-locked resonator 10.

Referring to FIG. 5D, the repetitive pulse train output from the ultrashort pulse laser 100 is shown. In this instance, the mode-locked resonator 10 includes the resonator 11 based on the microsphere having the diameter of 475 um and the saturable absorber 12 synthesized by ACS.

Referring to FIG. 5D, it is measured that the pulse width of the ultrashort pulse laser 100 is 2.9 ps, FTR is 6.49 PS, and the repetition rate is 154 GHz.

Figure 5E:
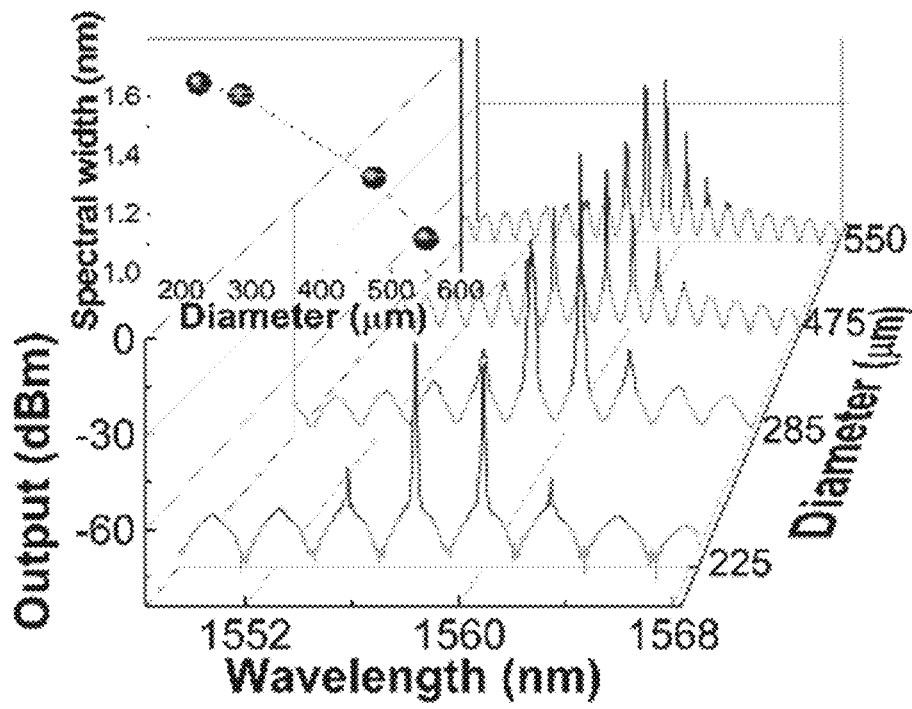
FIG. 5E shows analysis results showing the pulse spectral width of an ultrashort pulse laser as a function of diameter of an exemplary resonator.

FIG. 5E shows the analysis results showing the pulse spectral width of the ultrashort pulse laser as a function of the diameter of the exemplary resonator 11.

Referring to FIG. 5E, it is measured that the diameter of the mode-locked resonator 10 and the pulse spectral width are in inverse proportion. The diameter of the mode-locked resonator 10 and the spectrum of the pulse laser are shown.

Figure 5F:
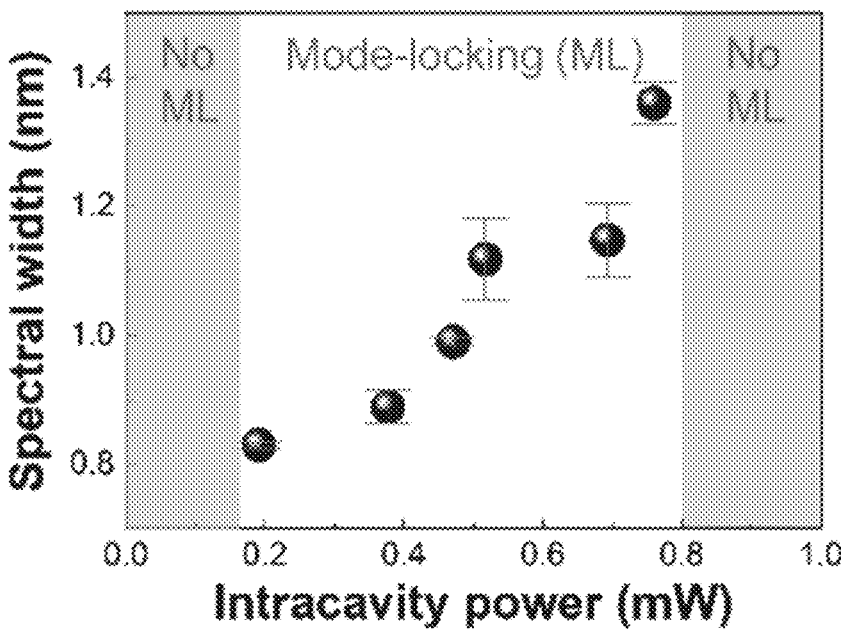
FIG. 5F shows analysis results showing the spectral width as a function of light intensity in an exemplary cavity.

FIG. 5F shows analysis results showing the spectral width as a function of light intensity in an exemplary cavity.

Referring to FIG. 5F, a relationship between the intracavity power in the ultrashort pulse laser 100 and the spectral width is shown. It is measured that as the intracavity power is higher, the spectral width is proportional to the intracavity power.

Figure 5G:
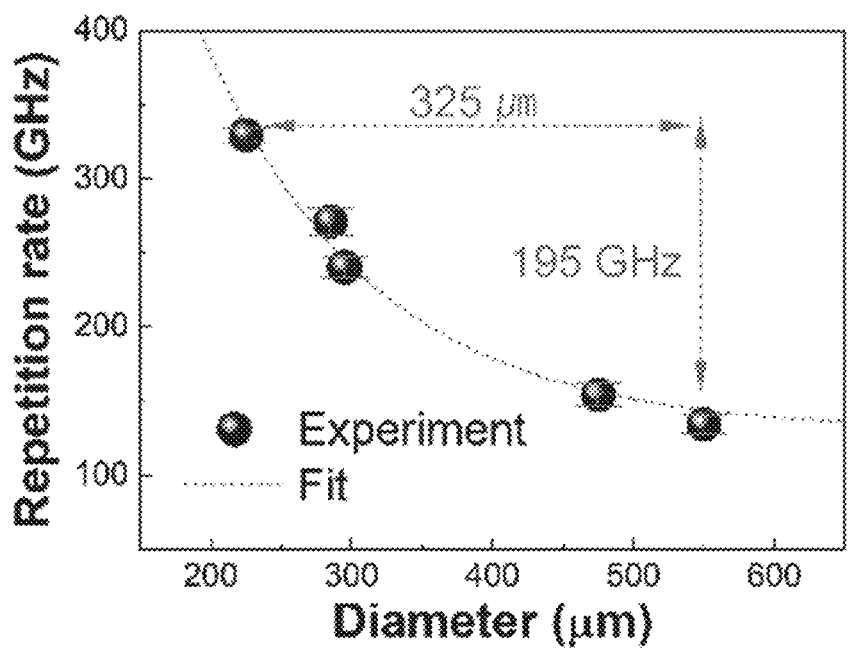
FIG. 5G shows analysis results showing a change in repetition rate of a pulse laser as a function of diameter of an exemplary mode-locked resonator.

FIG. 5G shows analysis results showing a change in repetition rate of the pulse laser as a function of diameter of the exemplary mode-locked resonator 10.

Referring to FIG. 5G, it is measured that the diameter of the mode-locked resonator 10 and the repetition rate are in inverse proportion. The exemplary mode-locked resonator 10 shows a relationship between the diameter and the repetition rate suited to the theory.

For example, the exemplary mode-locked resonator 10 may achieve a high repetition rate of about 400 to 100 GHz in the diameter range of about 200 um to 600 um.

Figure 6:
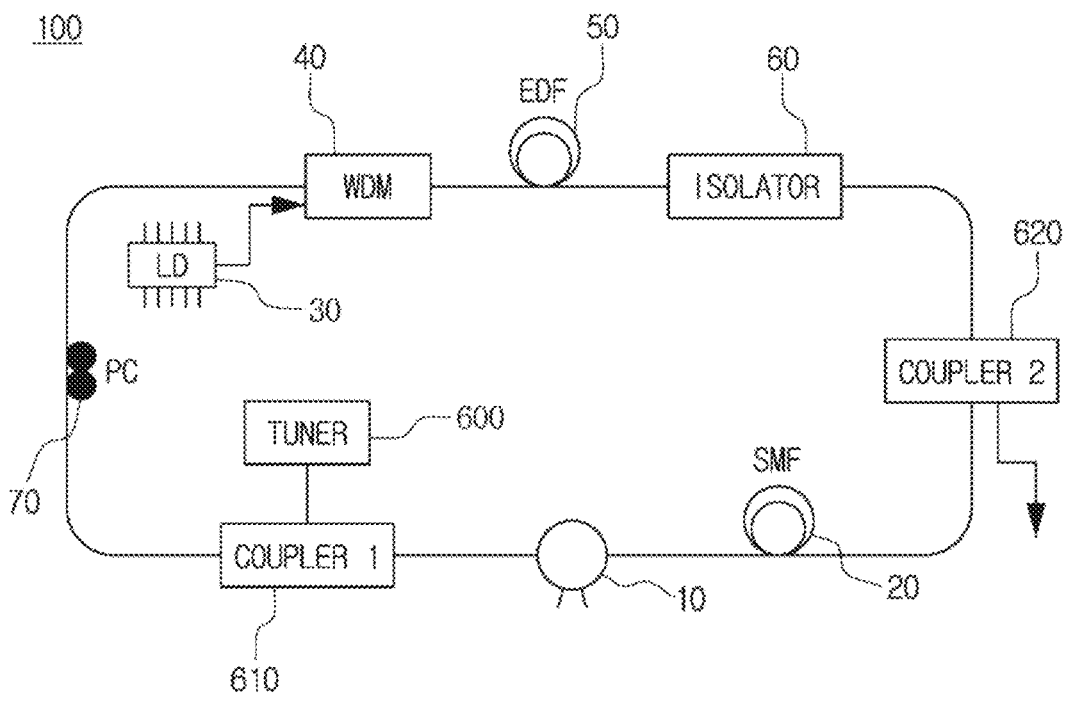
FIG. 6 is a diagram showing an ultrashort pulse laser according to an embodiment.

FIG. 6 is a diagram showing the ultrashort pulse laser 100 according to an embodiment.

Referring to FIG. 6, the ultrashort pulse laser 100 may further include a tuner 600, a first optical coupler 610 and a second optical coupler 620.

The tuner may inject pump light to compensate for the photothermal effect of the saturable absorber 12. The tuner may inject the pump light traveling in the opposite direction to the direction of the light traveling in the optical fiber 20 to compensate for the photothermal effect of the saturable absorber 12.

Here, the photothermal effect may refer to an effect in which light applied to the saturable absorber 12 is released as heat again. Specifically, the photothermal effect may refer to a phenomenon in which when electrons excited by the light absorption of the saturable absorber 12 return to the original state, energy is released and converted to thermal energy.

In this instance, the thermal energy released from the saturable absorber 12 changes the effective refractive index of the mode-locked resonator 10, and the tuner may inject the pump light to compensate for the photothermal effect.

In this instance, one end of the tuner may be connected to the first optical coupler 610 to receive part of the output light from the tapered optical fiber 21 and supply the pump light to the optical fiber 20 again. The tuner may inject the pump light traveling in the opposite direction that is independent of the light traveling in the optical fiber 20.

The second optical coupler 620 may output part of the light traveling in the optical fiber 20 to generate the pulse laser in the same way as the optical coupler 80 of FIG. 1.

Figure 7:
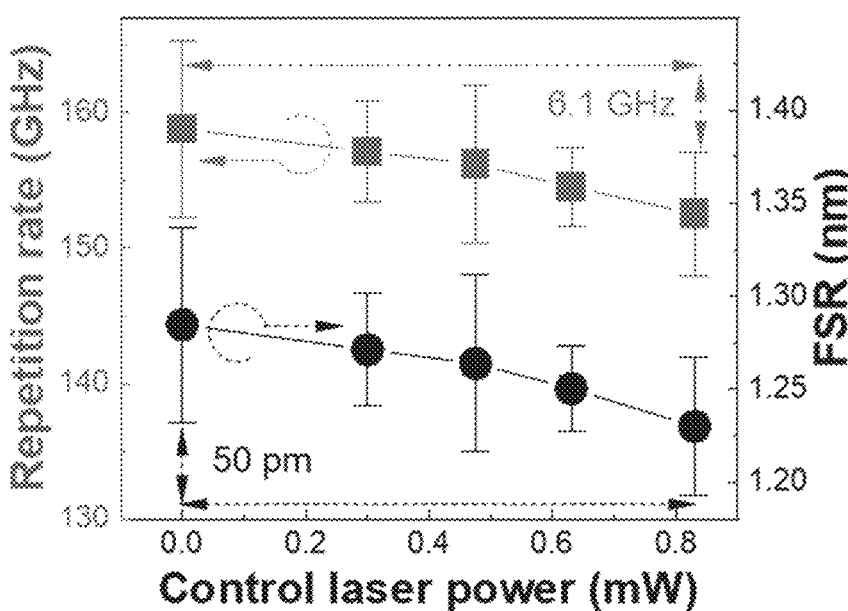
FIG. 7 is a diagram showing a change in pulse repetition rate by a photothermal effect of an ultrashort pulse laser according to an embodiment.

FIG. 7 is a diagram showing a change in pulse repetition rate by the photothermal effect of the ultrashort pulse laser 100 according to an embodiment.

In this instance, the experimental results of FIG. 7 may be the results of experiments performed by the ultrashort pulse laser 100 of FIG. 6.

Referring to FIG. 7, the repetition rate of the pulse laser as a function of the intensity of the pump light is shown. It is measured that when the intensity of the pump light increases from 0 to 0.8 mW, the repetition rate decreases from about 160 GHz to 153.9 GHz by 6.1 GHz.

Referring to FIG. 7 again, the FSR as a function of the intensity of the pump light is shown. It is measured that when the intensity of the pump light increases from 0 to 0.8 mW, the FSR decreases from about 1.29 nm to 1.24 nm by about 50 pm.

While the present disclosure has been described with reference to the embodiments shown in the drawings, this is provided by way of illustration and those skilled in the art will understand that a variety of modifications and changes may be made thereto. However, it should be understood that such modifications fall in the technical protection scope of the present disclosure. Accordingly, the true technical protection scope of the present disclosure should be defined by the technical spirit of the appended claims.

DETAILED DESCRIPTION OF MAIN ELEMENTS

10: Mode-locked resonator
11: Resonator
12: Saturable absorber
20: Optical fiber
21: Tapered optical fiber
30: Light source
40: Optical multiplexer
50: Amplifier
60: Optical isolator
70: Polarization Controller (PC)
80: Optical coupler
100: Ultrashort pulse laser
600: Tuner
610: First optical coupler
620: Second optical coupler

What is claimed is:

1. A mode-locked resonator 10, comprising:
a resonator 11 including a shape of a sphere; and
a saturable absorber 12 coated on a surface of the resonator 11,
wherein the resonator 11 is coupled with some photons traveling in a tapered optical fiber 21 disposed near the resonator 11 and interacts with the saturable absorber 12 based on a Whispering Gallery Mode (WGM),
wherein the mode-locked resonator 10 determines a pulse repetition rate of an ultrashort pulse laser beam output from the mode-locked resonator 10 based on a diameter of the sphere, wherein the shape of the sphere includes a shape of a microsphere produced by an electric arc, wherein a diameter of the microsphere is determined based on a diameter of a raw optical fiber to which the electric arc is applied, and
wherein the tapered optical fiber 21 injects pump light to compensate for a change in an effective refractive index of the mode-locked resonator caused by a photothermal effect of the saturable absorber 12.

2. The mode-locked resonator 10 according to claim 1, wherein the resonator 11 is disposed near the tapered optical fiber 21 without contact with the tapered optical fiber 21.

3. The mode-locked resonator 10 according to claim 1, wherein the saturable absorber 12 is formed by synthesizing and coating non-linear nanomaterials including graphene.

4. The mode-locked resonator 10 according to claim 3, wherein the saturable absorber 12 is formed by growing and coating the non-linear nanomaterials on the surface of the resonator 11 based on Atomic Carbon Spray (ACS).

5. The mode-locked resonator 10 according to claim 1, wherein the mode-locked resonator 10 filters some of wavelengths in a spectrum of light traveling in the tapered optical fiber 21 based on the whispering gallery mode.

6. The mode-locked resonator 10 according to claim 1, wherein the mode-locked resonator 10 outputs an ultrashort pulse laser beam by outputting light of a first intensity by constructive interference of phase matched modes in some photons coupled with the resonator 11 and outputting light of a second intensity by destructive interference of phase mismatched modes.

7. An ultrashort pulse laser 100, comprising:

the mode-locked resonator 10 according to claim 1;

a light source 30 to supply light;

an optical multiplexer 40 (a wavelength division multiplexer) to perform wavelength division multiplexing of the light;

an amplifier 50 to amplify the light;

a polarization controller 70 to control a polarization state of the light;

an optical isolator 60 to adjust a direction of the light; and an optical fiber 20 connecting the tapered optical fiber 21, the light source 30, the optical multiplexer 40, the amplifier 50, the polarization controller 70 and the optical isolator 60.

8. The ultrashort pulse laser 100 according to claim 7, wherein the resonator 11 is disposed near the tapered optical fiber 21 without contact with the tapered optical fiber 21.

9. The ultrashort pulse laser 100 according to claim 7, wherein the saturable absorber 12 is formed by synthesizing and coating non-linear nanomaterials including graphene.

10. The ultrashort pulse laser 100 according to claim 9, wherein the saturable absorber 12 is formed by growing and coating the non-linear nanomaterials on the surface of the resonator 11 based on Atomic Carbon Spray (ACS).

11. The ultrashort pulse laser 100 according to claim 7, wherein the mode-locked resonator 10 filters some of wavelengths in a spectrum of light traveling in the tapered optical fiber 21 based on the whispering gallery mode.

12. The ultrashort pulse laser 100 according to claim 7, wherein the mode-locked resonator 10 outputs the ultrashort pulse laser beam by outputting light of a first intensity by constructive interference of phase matched modes in some photons coupled with the resonator 11 and outputting light of a second intensity by destructive interference of phase mismatched modes.

* * * * *